United States Patent [19]

Smith

[11] Patent Number: 5,407,985
[45] Date of Patent: Apr. 18, 1995

[54] STABLE POLYAMIDE RESIN MICRODISPERSIONS

[75] Inventor: George A. Smith, Newtown, Pa.

[73] Assignee: Union Camp Corporation, Princeton, N.J.

[21] Appl. No.: 674,846

[22] Filed: Mar. 25, 1991

[51] Int. Cl.$^6$ ............... C08J 3/00; C08K 5/17; C08L 51/00
[52] U.S. Cl. .................. 524/238; 523/326; 523/353; 523/223; 524/253; 524/538; 524/606; 524/607; 524/608; 524/236; 524/239; 524/240; 524/217; 524/221; 524/237; 528/328
[58] Field of Search .......... 523/326, 353, 223; 524/253, 538, 606, 607, 608, 236, 238, 239, 240, 217, 221, 237; 528/328

[56] References Cited

U.S. PATENT DOCUMENTS 4,064,940 12/1977 Sparlin .................. 405/263

*Primary Examiner*—Paul R. Michl
*Assistant Examiner*—P. Niland
*Attorney, Agent, or Firm*—Woodcock, Washburn, Kurtz, Mackiewicz & Norris

[57] ABSTRACT

Stable aqueous microdispersions of finely divided polyamide resin particles and methods for the manufacture thereof are provided. The properties of these microdispersions are achieved by the addition thereto of an effective amount of a co-surfactant such as a lower alkyl alcohol. The provided microdispersions can be drawn into films which will form clear, continuous films at ambient or near-ambient temperatures regardless of the softening point of the polyamide resin. Dispersions according to this invention find use in hot melt adhesives, coatings, inks, and the like.

62 Claims, 1 Drawing Sheet

STABLE POLYAMIDE RESIN MICRODISPERSIONS

FIELD OF THE INVENTION

This invention relates to stable, aqueous microdispersions of finely divided polyamide resin particles having the capacity to form clear, continuous films at ambient temperatures.

BACKGROUND OF THE INVENTION

Polyamide resins are well known as a class of resins, as are numerous methods for their preparation. Polyamide resins are typically manufactured by reacting a di- or polyfunctional amine with a di- or polyfunctional acid. Most of the commonly-employed diacids and diamines yield polyamide resins which are essentially linear.

The properties of polyamide resins will vary considerably, depending upon the particular synthetic reactants employed. Polyamide resins which are prepared from relatively short chain diacids and diamines having, for example, 5–10 carbon atoms will tend to be relatively crystalline and have excellent fiber forming properties. These types of polyamide resins are typically referred to as nylons.

Polyamide resins are also prepared from relatively long chain polyfunctional acids and diamines. A particularly important class of polyamide resins of this type are referred to as polymerized fatty acid polyamide resins. The polymerized fatty acid polyamide resins are especially useful in products such as hot melt adhesives, water resistant coatings, and binders for printing inks, because of their physical properties, including high strength, excellent flexibility, water and solvent resistance, and the ability to form smooth, nontacky coatings and films.

The polyfunctional acids used in the preparation of polymerized fatty acid polyamide resins are derived from higher molecular weight unsaturated fatty acids by polymerization. In the polymerization process, the fatty acids having double bond functionalities combine to produce mixtures of higher molecular weight polymeric acids.

The polymerized fatty acid polyamide resins are, in turn, typically prepared by reacting one or more suitable diamines—most commonly relatively short chain diamines—with the polymerized fatty acid. Often, another diacid is also reacted to increase the softening point, tensile strength, or other properties. The polymerized fatty acid polyamide resins which are obtained tend to be more amorphous than the nylon types of polyamides resins and are generally more flexible. The differences in the physical properties of the polymerized fatty acid polyamide resins as compared to the nylon types of polyamide resins are related to the long chain length and structural variations of the polymerized fatty acid component.

One of the problems encountered with the polyamide resins—particularly the polymeric fatty acid polyamides—relates to the methods used to apply the resins to substrates. One method which has been used involves heating the polyamide resins above their melting point and then applying the molten resins to the substrate. This technique, however, has certain inherent problems. For example, polyamide resins typically have high melting points, often higher than the distortion temperatures of the substrates onto which they are to be applied. Accordingly, the hot melt method can only be used in certain limited applications which require relatively expensive application equipment. Thus, the use of molten polyamide resins is not practical in applications such as, for example, printing and coating. Molten polyamide resins are also impractical where the resin is to be applied as a latent hot melt layer to be activated at a later time.

It has been recognized that certain of the problems associated with the polyamide resins might be solved if the polyamides could be applied at ambient temperatures as solutions or dispersions. For many applications, however, solutions of polyamide resins are unsatisfactory. Polyamide resins as a class have excellent resistance to solvents; even with respect to those solvents in which the polyamide resins are soluble, the solubility typically is relatively low. Furthermore, the solvents which have been used to make polyamide resin solutions often adversely react with the substrates to which the polyamide resin solutions are applied. Further problems associated with solvent solutions are that most solvents used are relatively expensive, often difficult or impossible to remove from the applied coatings, and present fire, toxicity, and environmental pollution problems.

To overcome or at least reduce the problems associated with such solvent-based systems, it has been suggested to prepare emulsions or dispersions of the polyamide resins in water. Early emulsions were prepared by initially dissolving the polyamide resin in an organic solvent and then using selected emulsification agents to form an emulsion of the solvent solution and water. However, the resulting solvent/water/polyamide resin emulsions still had the problems associated with the presence of solvents and were relatively unstable. Those skilled in the art will appreciate that instability is manifested in aqueous resin emulsions or dispersions by phenomena such as phase separation, creaming, coalescence, flocculation, or gelation. Films formed from solvent-containing emulsions also tended to have an undesirable tackiness.

In British patent 1,491,136 there was disclosed a method for forming aqueous dispersions of various plastic powders, including polyamide resin powders. In the disclosed method, the polymer resin was first mechanically reduced to a powder form and then blended with water and a thickening agent. The method was less than satisfactory, The mechanical reduction of the resins to the required particle size was both expensive and difficult to control, especially for flexible polymers, and often caused thermal degradation of the polymers. Furthermore, the resulting thickened dispersions had limited utility in many applications because of the relatively high viscosity due to the thickening agent.

It is also known to render a polyamide resin more readily dispersible in water by chemically modifying the resin so as to include solubilizing groups. This includes, for example, incorporating alkoxymethyl groups, as disclosed in U.S. Pat. No. 2,430,860 (Cairns) and U.S. Pat. No. 2,714,075 (Watson, et al.). However, the incorporation of the additional groups into the polyamide resin increases the cost of the polymer and also typically reduces the desirable properties of the polyamide resins, especially in relation to water and solvent resistance.

Another known method for increasing the water dispersibility of polyamide resins involves formation of a resin having a considerable excess of either free carboxyl or free amine groups. At least a portion of the free acid or free amine groups are then neutralized to form salt groups on the polyamide resin, which salt groups act as internal surfactants to facilitate the dispersion of the modified polyamide in water. In U.S. Pat. No. 2,811,459 (Wittcoff, et al.) there is disclosed a method for preparing polymerized fatty acid polyamide dispersions wherein the polyamide is formed from a substantial excess of a diamine. The resulting polyamide resins are then dispersed in an aqueous solution of an acid so that the acid forms ammonium salt groups which act as internal surfactants which allow formation of an aqueous dispersion. In U.S. Pat. No. 2,768,090 (Wittcoff, et al.) a similar process is disclosed wherein the excess amine groups of a polyamide resin are reacted with an acid to form intrinsic ammonium salt groups and, hence, a cationic dispersion which is converted to an anionic dispersion by charge inversion. A similar salt forming process utilizing free amino groups was disclosed in U.S. Pat. No. 2,824,848 (Wittcoff). In U.S. Pat. No. 2,926,117 (Wittcoff) there is disclosed a method wherein the polyamide resin formed with a deliberate excess of acid groups is then dispersed in an aqueous medium containing an alkaline substance to cause formation of carboxylate salt groups which act as internal surfactants.

The discussed methods for preparing aqueous dispersions of polymerized fatty acid polyamides having salt groups are relatively effective in initially forming aqueous dispersions. However, the dispersions have limited stability and are not satisfactory for use in many applications, as their synthesis requires the presence of substantial amounts of free acid or free amino groups which adversely effect the performance properties of the dispersed polyamide resin. Optimal properties are typically achieved by conducting the amidations so as to cause as complete as a reaction as possible. This requires that approximately stoichiometric amounts of the starting diacid and diamine be employed and that the reaction be conducted so as to produce a final product having a low amine number and low acid number. The presence of substantial excesses of either reactant or an incomplete reaction—as required for the prior art salt forming polyamide material—inherently reduces the chain length and the resulting strength and flexibility of the polyamide resin.

Furthermore, incorporation of polymers having substantial excess amounts of unreacted polymerized fatty acids typically results in unstable materials. The fatty acids can be liberated from the polymer and cause exceptional tackiness and undesirable degradation of the desired properties of the polyamide resin. These polyamide resins continue to react during application, which causes increases in molecular weight and coating viscosity, as well as changes in the melting point. A still further problem encountered with the method wherein the salt forms of the polyamide resins are used is that the salts tend to decompose during application and the resulting material becomes undesirably tacky when applied. This is particularly undesirable in many applications, such as in printing inks and protective coatings.

Certain of the problems associated with aqueous polyamide resin dispersions can be obviated by the methods disclosed in U.S. Pat. No. 4,886,844 (Hayes) for the preparation of stable aqueous dispersions of nonsolvated, un-neutralized, polymerized fatty acid polyamide resins having low acid and amine number. As disclosed therein, molten resin, water, and a surfactant are subjected to sufficient comminuting forces to form an emulsion in which resin droplets have a volume average size distribution of about 20 microns or less.

However, even the aqueous polyamide resin dispersions according to Hayes are not without problems attendant to their use. For example, these aqueous dispersions can be drawn into films, but must be heated to within about 10° C. of the resin's softening point for clear, continuous films to properly form. For example, in U.S. Pat. No. 557,649 (Wittcoff), the use of polyamide suspensions in heat-seal compositions requires a minimum temperature of 70° C. Thus, it would be more desirable if such films could be formed at lower temperatures, preferably ambient temperatures. This is particularly true where resins having relatively high softening points are employed.

SUMMARY OF THE INVENTION

The present invention provides stable, aqueous microdispersions of finely divided polyamide resin particles dispersed in water, which microdispersions have improved stability and film-forming properties. Specifically, the aqueous polyamide microdispersions of the present invention are stable against phase separation and gelation. Additionally, the microdispersions are capable of forming non-tacky, clear, continuous films at ambient or near-ambient temperatures.

The microdispersions of the present invention are produced by first forming a water-in-oil emulsion by mixing together at a first temperature the polyamide resin, water, at least one surfactant, at least one cosurfactant and a neutralizing acid or base, wherein the water and surfactant are present in amounts effective to form the water-in-oil emulsion, the co-surfactant is present in an amount effective to form the aqueous microdispersion, the neutralizing acid or base is present in an amount effective to neutralize residual acid or base on the polyamide resin, and the first temperature is effective to liquify the polyamide resin and to maintain an oil phase of a water and oil emulsion as a liquid. The aqueous microdispersions are then formed by mixing together at a second temperature the water-in-oil emulsion and a second amount of water effective to form an oil-in-water emulsion. The oil-in-water emulsion is then cooled to a third temperature effective to form the aqueous microdispersion. At least one water soluble, dipolar chemical moiety is added in an amount effective to stabilize the aqueous microdispersion to either the oil-in-water emulsion at the second temperature or to the aqueous microdispersion.

The stable, aqueous microdispersions thus produced, when drawn into a film, form a non-tacky, clear, continuous film upon drying at ambient or near-ambient temperatures.

DETAILED DESCRIPTION OF THE INVENTION

Figure 1:
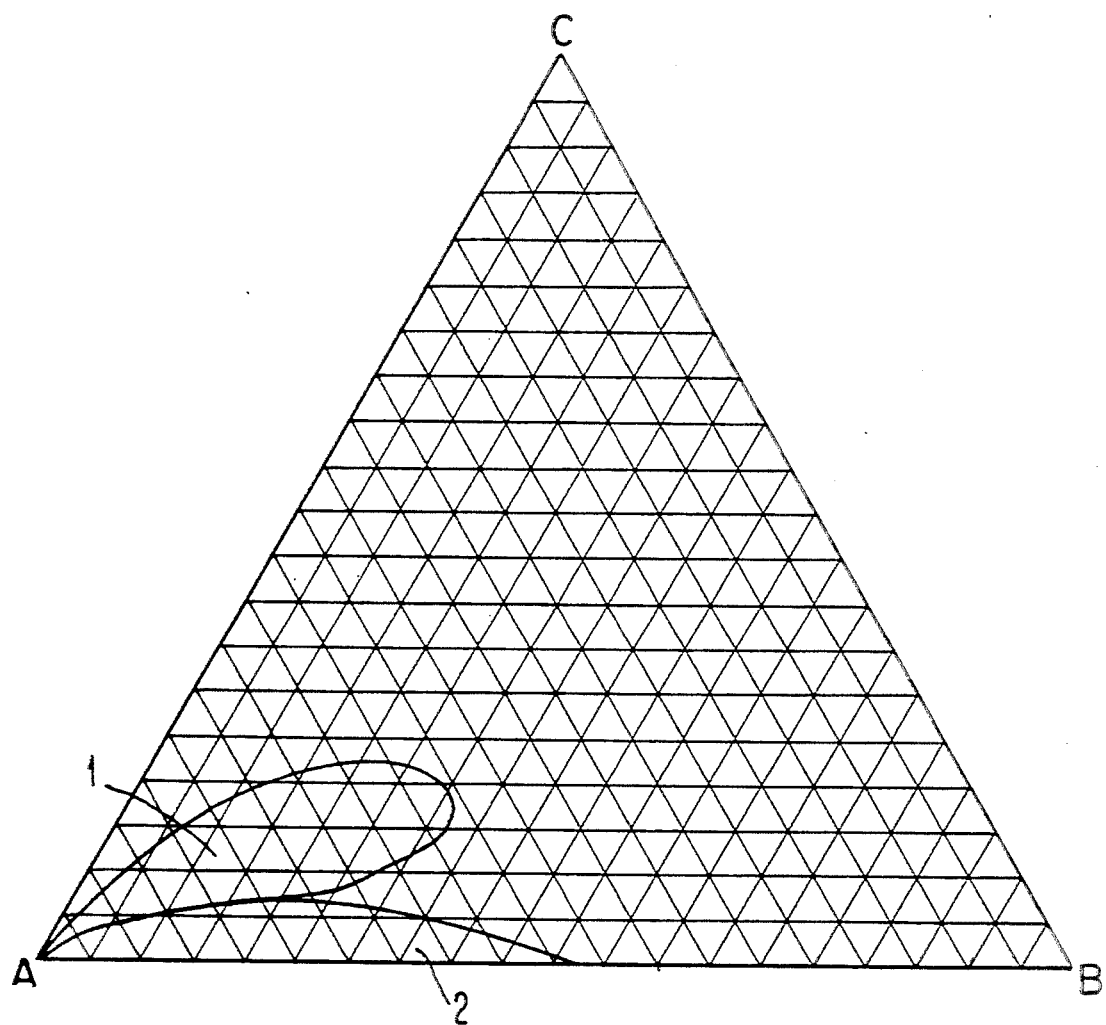

Those skilled in the art will appreciate that emulsions of polyamide resin in water, more commonly known as oil-in-water emulsions, are to be contrasted with emulsions of water in resin, which emulsions are more commonly known as water-in-oil emulsions. Techniques for converting water-in-oil emulsions to oil-in-water emulsions are generally known to those skilled in the art as inversions. The water added to invert an emulsion is known as inversion water. The conversion of an oil-in-water emulsion to a water-in-oil emulsion is also known as an inversion. The term "oil phase" as referred to herein is understood to mean that phase of either the water-in-oil or the oil-in-water emulsion which includes the polyamide resin, at least one surfactant, and at least one co-surfactant.

It will be appreciated that there exist numerous types of polyamide resins which can be employed to form aqueous dispersions according to the present invention. The terms "polyamide resin" or "resin" as employed herein are intended to include compositions comprising individual, chemically distinct polymerized fatty acid polyamide resins as well as blends thereof. Polyamide resins can be obtained commercially or can be prepared by generally well known methods.

The term "polymerized fatty acid" is intended to be generic in nature and to refer to polymerized acids obtained from fatty acids. The term "fatty acids" refers to saturated, ethylenically unsaturated and acetylenically unsaturated, naturally occurring and synthetic monobasic aliphatic carboxylic acids which contain from about 8 to about 24 carbon atoms. While specific references are made in this application to polymerized fatty acid polyamide resins which are obtained from $C_{18}$ fatty acids, it will be appreciated that the methods of this invention can likewise be employed with other polymerized fatty acid polyamides.

The preferred starting acids used for the preparation of the polymerized fatty acids used in this invention are oleic and linoleic acids, due to their ready availability and relative ease of polymerization. Mixtures of oleic and linoleic acids are found in tall oil fatty acids, which are a convenient commercial source of these acids. Fatty acids can be polymerized using various well known catalytic and noncatalytic polymerization methods. A typical composition of the polymerized $C_{18}$ tall oil fatty acids which are used as the starting materials for the polyamide resins used in the present invention is:

| $C_{18}$ | monobasic acids (monomer) | 0–15% by wt. |
|---|---|---|
| $C_{36}$ | dibasic acids (dimer) | 60–95% by wt. |
| $C_{54}$ | (or higher) trimer acid or polybasic acids | 0.2–35% by wt. |

In preparing polymerized fatty acid polyamide resins for use in the present invention, it is preferable that the starting polymerized fatty acid contain as high a percentage as possible of the dimer ($C_{36}$ dibasic) acid in order to obtain optimum physical properties in the final product.

In addition to the polymerized fatty acids, a wide variety of dicarboxylic acids can be used to prepare polymerized fatty acid polyamide resins, including aliphatic, cycloaliphatic, and aromatic dicarboxylic acids. Representative of such acids—which may contain from 2 to 22 carbon atoms—are oxalic, glutaric, malonic, adipic, succinic, suberic, sebacic, azelaic, pimelic, terephthalic, isophthalic, dodecanedioic and phthalic acids, naphthalene dicarboxylic acids, and 1,4-or 1,3-cyclohexane dicarboxylic acids. Preferred dicarboxylic acids employed in the invention are straight chain aliphatic diacids having at least 6 carbon atoms and more preferably 6 to about 22 carbon atoms such as azelaic, sebacic, and dodecanedioic dicarboxylic acids. It should be understood that use of the corresponding acid anhydrides, esters, and acid chlorides of these acids is included in the term "dicarboxylic acid". These acids and anhydrides are readily available from commercial sources and methods for their preparation are well known.

Monocarboxylic acids may be added to control molecular weight. Preferred monocarboxylic acids are linear and have 2 to 22 carbon atoms. Most preferred are stearic, tall oil fatty and oleic acids.

The diamines used in the preparation of the polymerized fatty acid polyamide resins employed in the present invention may be one or more of the known aliphatic, cycloaliphatic or aromatic diamines having from about 2 to about 20 carbon atoms. Preferred are the alkylene diamines, such as ethylene diamine, 1,3-diaminopropane, 1,4-diaminobutane, terephthalyl diamine, known as p-xylene diamine, 1,6-hexamethylene diamine, bis-(4-cyclohexylamine)methane, 2,2-bis-(4-cyclohexylamine)propane, polyglycol diamines, isophorone diamine, isophthalyl diamine, known as m-xylene diamine, cyclohexanebis(methylamines), 1,4'-bis-(2-aminoethyl)benzene, dimer diamine, polyether diamines, methyl pentamethylene diamine, and piperazine. These diamine compounds are all prepared by well known methods and many are commercially available. Particularly preferred are the straight chain aliphatic diamines of 2 to about 20 carbons atoms, especially ethylene diamine and hexamethylene diamine, and cycloaliphatic diamines, especially 4,4'-methylenebis(cyclohexylamine) and piperazine.

In the method of the present invention, it is desirable to use as the polymerized fatty acid polyamide a material which is the result of as complete an amidation reaction as possible between the starting polymerized fatty acid and the diamine. Those skilled in the art will recognize that the degree of completion of the amidation process can be determined by evaluating the acid number and the amine number of the final polymer. Ideally, the amine or the acid numbers, depending upon which is in lower stoichiometric amounts, of the polyamide resin employed should be zero (0). However, it is often difficult, if not impossible, to reach complete reaction, and this value should be one or less. It has been found, however, that polymerized fatty acid polyamide resins having relatively low amine numbers of, for example, up to about 10 and relatively low acid numbers up to about 12 are especially useful in the present invention.

The number of free acid groups and free amine groups present in the polymerized fatty acid polyamide resin are directly related to the relative amount of the polymeric fatty acids, dicarboxylic acids and diamines involved in the polymerization reaction and the degree of completion of the reaction. For the above reasons, approximately stoichiometric amounts of the polymerized fatty acids plus the dicarboxylic acids and the diamines based on the total number of available acid and amine groups should be used to prepare the polyamide resins for this invention and the reaction conditions should be selected to ensure completion or substantial completion of the amidation reaction. The reaction conditions required for the amidation reaction are generally well known in the art, with the reaction being generally conducted at temperatures from about 100° C. to about 300° C. for from about 1 to about 8 hours. The use of acid catalysts, such as phosphoric acid, and vacuum can be used, especially in the latter part of the reaction, to yield a more complete amidation reaction.

It will be appreciated that a wide variety of water soluble surfactants can be employed successfully in preparing microdispersions of the present invention, in part because of the relative neutral charge of most polymerized fatty acid polyamide resins. The surfactant or combination of surfactants which are preferred in the process of this invention are ones which will promote the emulsification of the molten polyamide resin and the water and which will also act to stabilize the final microdispersion of the polyamide resin particles in the water. Those skilled in the art will recognize that the choice of a surfactant will depend intimately upon the particular polyamide resin employed. The surfactants which are selected are those which are capable as acting either as oil-in-water or water-in-oil emulsifying agents for the polyamide resin-water mixture. The surfactants include well known anionic, polar and non-polar nonionic, amphoteric, and cationic surfactants.

Among the surfactants which have been found to be especially useful are the non-ionic surfactants Tergitol ™ NP-40 and Tergitol ™ 15-S-40 (Union Carbide, Danbury, CT) and Igepal ™ C0-850 and Igepal ™ C0-870 (GAF Corporation, Wayne, NJ).

While all surfactants are not suitable for use in the method of the present invention, it has been found that a wide range of surfactants are suitable. It is relatively simple to screen suitable surfactants for use in the presence of this invention. It was found for certain embodiments, for example, that the preferred surfactants are those which exhibit outstanding ability to cause the emulsification of the water in the liquified polymerized resin. These surfactants must also have the ability to form emulsions of the liquified resin in the water upon inversion of the water-in-oil emulsion. These surfactants are typically also highly effective for imparting long term stability to the final dispersion. The relative amount of the employed surfactant added is based upon the amount of the polymerized fatty acid polyamide resin which is to be present in the final dispersion and upon the particular surfactant used. It has been found, however, that optimum results are obtained when the surfactant is used in an amount from about 0.05% to about 10% by weight, based on the weight of the polymerized fatty acid polyamide resin.

The employment of a co-surfactant in accordance with this invention is important in that it aids in the formation of aqueous microdispersions having resin particles of a sufficiently small size regime as described hereinbelow. The small dispersed particles formed, in turn, provide improved performance properties. For example, small polyamide resin particles facilitate the formation of non-tacky, clear, continuous films at ambient. or near ambient temperatures when the dispersion is drawn down into a film with a blade or by some other well-known technique. The co-surfactants must be sufficiently volatile so as to be substantially absent from the films formed from the aqueous microdispersions. Additionally, the co-surfactants must be able to hydrogen bond and must be soluble in both the water and liquified polyamide resin phases in the emulsion stages of the process. Non-limiting examples of co-surfactants suitable for use in this invention are lower alkyl alcohols having up to 10 carbon atoms. Preferred alcohol co-surfactants include ethanol, pentanol, hexanol, n-propanol, butanol, and isopropanol. Isopropanol is particularly preferred.

The role of the surfactant/co-surfactant component in the microdispersion is to control the phase behavior of the system. To better understand the phase behavior, a ternary phase diagram (FIG. 1) has been constructed. As the microdispersions of the present invention generally comprise 6 components, the ratio of several of the components have been fixed for ease of illustration.

Specifically, Point A represents a concentration of 100% of component A (water), Point B represents 100% of Component B (45 parts polyamide to 1 part mixture of a neutralizing acid or base and an amino acid) and Point C represents 100% of Component C (0.4 parts surfactant to 1 part co-surfactant). All percentages are weight percentages based on the total weight of the microdispersion. Region 1 represents that region in which microdispersions, those having a volume average particle size distribution of less than about 1000 nanometers are formed. Region 2 represents that region in which "regular" dispersions, those having a volume average particle size distribution of greater than about 1000 nanometers are formed. In practice, this means that a microdispersion is either translucent or transparent while a "regular" dispersion is opaque or cloudy.

Due to the surfactant/co-surfactant component, finely divided polyamide resin droplets having a size less than about 1000 nanometers are formed in the emulsion stage. Upon solidification, the droplets form finely divided polyamide particles dispersed in the water, thereby forming the microdispersions of the present invention.

It is believed that the surfactant/co-surfactant component allows either the homogeneous mixture of liquified polyamide resin, surfactant and co-surfactant or the water-in-oil emulsion to be cooled below the ring and ball softening point of the neat polyamide resin, while still maintaining the oil phase of the emulsion in the liquid state. The "melting point" of the oil phase is that temperature below which the resin droplets solidify to form the aqueous microdispersion. This allows the inversion of the water-in-oil emulsion to the oil-in-water emulsion to occur below the ring and ball softening point of the neat polyamide resin.

While it is essential to add an amount of co-surfactant effective to form the aqueous microdispersion as described hereinabove, typically, the effective amount of the co-surfactant will be less than would be required to completely dissolve the resin. In fact, amounts of the co-surfactant sufficient to completely dissolve the resin result in the dissolved resin being incorporated into the water phase of the microdispersion, which results in excessive viscosity in the resulting aqueous polyamide microdispersion. This effective amount usually will be between about 10% and about 40% by weight, based on the weight of polyamide resin.

It will be appreciated that polyamide resins typically contain residual acid or base attributable to the synthetic source of the resin. While it is preferred that aqueous microdispersions be formed from polymerized fatty acid polyamide resins which have relatively low (i.e., less than about 12) acid or amine numbers, aqueous microdispersions have been formed from polyamide resins with acid numbers up to about 45 and amine numbers up to about 250. It will be appreciated that acid number represents the titratable acid present in a gram of resin expressed in terms of milligrams potassium hydroxide required to neutralize that amount of acid. Likewise, amine number represents the acid titratable amine groups present in a gram of resin expressed in terms of equivalent milligrams potassium hydroxide.

It is preferred in accordance with this invention that a resin's residual acid or base be neutralized to some empirically determined level prior to formation of aqueous microdispersions. The preferred degree of neutralization will vary from resin to resin and will be manifested by incremental improvement in the performance properties of aqueous dispersions prepared therefrom. Preferred neutralizing bases are potassium hydroxide, sodium hydroxide, ammonium hydroxide, and ethanolamines. Preferred neutralizing acids are acetic acid, hydrochloric acid, sulfuric acid, and phosphoric acid.

A wide variety of water soluble, dipolar chemical moieties, such as amino acids, may be incorporated into aqueous microdispersions of polyamide resin in accordance with this invention, so long as they possess sufficient amphoteric character to stabilize the microdispersions. It will be appreciated that the amphoteric character of an amino acid relates to the degree to which its constituent molecules possess points having opposite charges.

The water soluble, dipolar chemical moieties used in the process of this invention are selected from the group consisting of amino acids of the formula

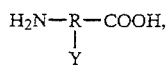

anionic and cationic salts derived therefrom and mixtures thereof, wherein R represents an alkyl, alkenyl or aryl group having up to 10 carbon atoms and Y is in a polar or non-polar ionic, or non-ionic substituent. Examples of such amino acids are p-aminobenzoic acid, glycine, lysine, arginine, phenylalanine and serine. Most preferred are glycine and p-aminobenzoic acid.

In preferred embodiments of the methods for preparing the stable, aqueous microdispersions of the present invention the solid polyamide resin is heated substantially in the absence of oxygen to a temperature at least as high as its melting point to liquify the resin.

This liquification process is preferably conducted in a closed vessel under a protective blanket of nitrogen. The melting temperature of the polymerized fatty acid polyamide resin will vary considerably depending upon the particular starting reactants employed to prepare the polyamide resin. Typically, however, polyamides will melt in the temperature range from about 100° C. to 200° C. If the temperature to which the molten polyamide resin will be heated for liquification is above the boiling point of water, the process equipment used in the method of the present invention must be capable of being operated at elevated pressures and temperatures.

A homogeneous mixture of the liquified polyamide resin, water, surfactant and co-surfactant is then formed by mixing together the liquified polyamide resin, a first amount of water effective to form the homogeneous mixture, at least one surfactant in an amount effective to form a water-in-oil emulsion and at least one co-surfactant in an amount effective to form the aqueous microdispersion, at a temperature effective to maintain the oil phase of the emulsion as a liquid. The surfactant may be anionic, cationic, non-ionic or amphoteric and in an amount from about 0.05 to 10% by weight of the polyamide resin. The co-surfactant preferably is an alcohol having up to 10 carbon atoms and is used in an amount from 10 to 40% by weight of the polyamide resin.

The water, surfactant and co-surfactant may be preheated to a temperature above the melting point of the polyamide resin in a separate vessel and then added to the liquified polyamide resin. Preferably, the water, surfactant and co-surfactant are added to the liquified polyamide resin without preheating, at a rate sufficiently slow such that the temperature of the mixture is maintained above the effective temperature as described above. Preferably the water and surfactant are added simultaneously in the form of an aqueous surfactant solution, while the co-surfactant is added thereafter.

In other embodiments, a mixture of polyamide resin, water, surfactant and co-surfactant is formed by mixing the solid polyamide resin, a first amount of water effective to form the mixture, at least one surfactant in an amount effective to form a water-in-oil emulsion upon liquification of the resin and at least one co-surfactant in an amount effective to form the aqueous microdispersion. The mixture is then heated to a first temperature above the melting point of the oil phase, which temperature is effective to liquify the polyamide resin in the mixture to form a homogeneous mixture of the liquified polyamide resin, water, at least one surfactant and at least one co-surfactant.

A water-in-oil emulsion is then formed by mixing with the homogeneous mixture a second amount of water effective to form the water-in-oil emulsion comprising from about 5 to 50% by weight of the emulsion, said second amount of water including an amount of acid or base effective to neutralize residual acid or base on the polyamide resin.

In the most preferred embodiment, the temperature of the homogeneous mixture is cooled to a temperature less than but not more than about 50° C. below the ring and ball softening point of the polyamide resin, said temperature also being above the melting point of the oil phase. A solution of the neutralizing acid or base and an amount of water effective to form the water-in-oil emulsion is then added to the homogeneous mixture at a rate sufficiently low so that the temperature remains substantially unchanged.

In alternate embodiments, the aqueous neutralizing solution of acid or base is added to the homogeneous mixture before cooling the mixture. The aqueous acid or base solution preferably is added at a rate sufficiently slow so as to maintain the temperature of the mixture greater than the melting point of the oil phase. In other embodiments, the aqueous neutralizing solution of acid or base is heated in a separate vessel to a temperature which is at least as high as the melting point of the oil phase. More preferably, the acid or base solution is heated to a temperature at least slightly higher than the melting point of the oil phase. Under these conditions it may be required to heat the solution and maintain it under pressure in order to reach a temperature higher than the melting point of the oil phase. Alternatively, the acid or base solution is heated to a temperature somewhat below the temperature of the homogeneous mixture and the homogeneous mixture is heated to a temperature significantly above the melting point of the oil phase, such that the resulting blend of aqueous base or acid and homogeneous mixture will have a temperature above the melting point of the oil phase. The blend of the homogeneous mixture and aqueous neutralizing acid or base is then cooled to a temperature less than but not more than about 50° C. below the ring and ball softening point of the polyamide resin, said temperature also being above the melting point of the oil phase.

The mixture is then subjected to comminuting forces sufficient to form an emulsion in which the droplets of the molten polymerized fatty acid polyamide resin preferably have a volume average size distribution of less than about 1000 nanometers. The particular type of apparatus used for applying the comminuting force to the blend of the polyamide resin, water, surfactant, cosurfactant, and neutralizing acid or base is to some extent a matter of choice and can include apparatus which operates on the basis of shear, impact, or a combination of these process steps. The equipment includes commercially available apparatus such as homogenizers, submicron dispersers, emulsifiers, colloid mills, ultrasonic sound mixers and the like. In general it is preferable for process purposes to run the blend through the comminuting equipment for one pass in that this facilitates the manufacturing process. It should be appreciated, however, that the blend may be sent through the comminuting equipment for a number of passes in order to obtain sufficiently small droplets. In general, the smaller the size of the liquid droplets of an emulsion, the more desireable the dispersion made therefrom. This is true for dispersions prepared by inversion techniques as well.

An oil-in-water emulsion is then formed at a temperature above the melting point of the oil phase and less than but not more than about 50° C. below the ring and ball softening point of the polyamide resin by mixing with the water-in-oil emulsion a third amount of water effective to form the oil-in-water emulsion, said third amount of water including at least one water soluble, dipolar chemical moiety, as described hereinabove, in an amount effective to stabilize the aqueous microdispersion. The oil-in-water emulsion comprises between about 20% and 60% by weight polyamide resin. The amount of water soluble, dipolar chemical moiety effective to stabilize the aqueous microdispersions is preferably from about 0.25% to about 3.0% by weight, based on the weight of the polyamide resin. In preferred embodiments the inversion water and water soluble, dipolar chemical moiety are heated to a temperature just below the temperature of the water-in-oil emulsion prior to mixing with the water-in-oil emulsion so that the emulsion is not "thermally shocked" such that the liquid polyamide resin droplets prematurely solidify.

The oil-in-water emulsion is then cooled to a temperature below the melting point of the oil phase to cause the finely divided droplets in the emulsion to solidify into finely divided dispersed particles, thereby forming the aqueous microdispersions of the present invention. This cooling step is preferably conducted rapidly so as to prevent coagulation of the particles during the stage of solidification, wherein the droplets become semi-solid and highly adhesive. Cooling of the oil-in-water emulsions prepared at pressures above atmospheric pressure can be rapidly performed by pumping the emulsion through a heat exchanger or the like. Alternatively, the cooling can be effected by rapidly reducing the pressure to cause evaporation of the water. A combination of these techniques can also be employed.

The microdispersions of this invention do not require that the starting polymerized fatty acid polyamide resin initially be completely solvated in a solvent or that the polyamide resin be formed with excess amine and acid groups to allow for salt formation as is required in the prior art methods of forming dispersions.

It is preferred in accordance with this invention that polyamide resin microdispersions have volume average particle size less than about 1000 nanometers, more preferably between about 10 and about 400 nanometers, most preferably between about 100 and 150 nanometers. Those skilled in the art will appreciate that particle size can be determined by a number of methods, such as sedimentation or laser light scattering techniques. Determination of particle size by photon correlation spectroscopy is preferred.

The aqueous microdispersions of the present invention preferably comprise from about 20% to 60% by weight polyamide resin and from about 30% to 70% by weight water. The microdispersions also include at least one surfactant selected from the group consisting of anionic, cationic, non-ionic and amphoteric surfactants, said amount preferably being from about 0.05% to about 10% by weight, based on the weight of the polyamide resin. The aqueous microdispersions also comprise at least one co-surfactant selected from the group consisting of alcohols having up to 10 carbon atoms, most preferably isopropyl alcohol, in an amount effective to form the aqueous microdispersions, said amount preferably being from about 10% to about 40% by weight, based on the weight of the resin. The aqueous microdispersions further include an amount of acid or base effective to neutralize a residual acid or base on the polyamide resin.

The stable, aqueous microdispersions of polyamide resin of the present invention comprise at least one amino acid, as described hereinabove, in an amount effective to stabilize the resulting aqueous microdispersions. Most preferred is from about 0.25% to 3.0% by weight glycine, based on the weight of the polyamide resin. Amino acids may be incorporated as a reactant during formation of the oil-in-water dispersion, or may be incorporated into the dispersion after the formation thereof. It is preferred that the aqueous microdispersions contain water soluble, dipolar chemical moieties upon formation.

The polymerized fatty acid polyamide aqueous microdispersions of this invention can contain various additives in addition to the above-noted materials, such as water soluble alkali metal salts of polymeric organic acids and protective colloids such as lignin derivatives, proteins, water soluble cellulose derivatives, starch, alginic acid, and long chain alcohols and lecithin. The amount of such additives employed can vary in amounts from about 0% to about 5% by weight, based on the weight of the polyamide resin.

The polyamide dispersion may likewise contain other materials such as viscosity modifiers, plasticizers, dyes, pigments and the like. In this regard, it should be noted that the excellent stability of the polymerized fatty acid polyamide resin dispersions of this invention allow substantial loadings of additives without adversely affecting the overall stability of the polyamide dispersion.

The stable, aqueous microdispersions may be used in, for example, overprint varnishes and aqueous inks, as well as in structural and laminating adhesives. Additional objects, advantages, and novel features of this invention will become apparent to those skilled in the art upon examination of the following examples thereof, which are not intended to be limiting.

EXAMPLE 1

400 lbs. of polyamide resin, UNI-REZ TM 2620 (Union Camp Corp., Wayne, NJ), were charged to a 200 gallon reactor. The resin was heated to 127° C. under 20 psi of nitrogen until it became molten. At an agitator speed of 140 rpm, 28.6 lbs. of Tergitol TM NP-40 (70% aqueous solution) followed by 80.0 lbs. of isopropanol were added. The mixture was cooled to 82° C. A solution of 10.3 lbs. KOH (45% aqueous solution) in 71.4 lbs. deionized water was added to form the initial water-in-oil emulsion. This was followed by the addition of a solution of 4.0 lbs. glycine in 801 lbs. deionized water over an 85 minute period in order to invert the water-in-oil emulsion to an oil-in-water emulsion. The emulsion was cooled to 40° C. and the resulting microdispersion was discharged.

The product was a yellow, translucent dispersion of 29% solids. Photon correlation spectroscopy showed that the volume average particle size was 150 nanometers. The microdispersion formed a clear, continuous film at room temperature when drawn down on polypropylene film. The aqueous microdispersion product is stable against phase separation or gelation for periods in excess of one year.

EXAMPLE 2

200 g of polyamide resin, UNI-REZ ™ 2641 (Union Camp Corp., Wayne, NJ), 14 g of Tergitol ™ NP-40 (70% aqueous solution), and 40 g of isopropanol were charged to a 2 liter Parr reactor and heated to 140° C. with 100 RPM stirring. The mixture then was cooled to 120° C. A solution of 4 g KOH (85% aqueous solution) and 50 g deionized water was added to form the initial water-in-oil emulsion. This was allowed to equilibrate for 30 minutes at 120° C. A solution of 2 g glycine and 600 g deionized water was added to invert the water-in-oil emulsion to an oil-in-water emulsion. The resulting microdispersion was cooled to 40° C. and discharged.

The product was a purple translucent dispersion at 25% solids. Photon correlation spectroscopy showed that the volume average particle size was about 100 nanometers. The microdispersion formed a clear, continuous, non-tacky film at room temperature when drawn down on a polypropylene film. The aqueous microdispersion product is stable against phase separation or gelation for periods in excess of one year.

What is claimed is:

1. A method for preparing a stable, aqueous microdispersion of a polyamide resin, comprising the ordered steps of:
   (a) forming a water-in-oil emulsion by mixing together at a first temperature:
   the polyamide resin;
   water;
   at least one surfactant;
   at least one co-surfactant; and
   a neutralizing acid or base, wherein the water and surfactant are present in amounts effective to form the water-in-oil emulsion, the co-surfactant is present in an amount effective to form the aqueous microdispersion, the neutralizing acid or base is present in an amount effective to neutralize residual acid or base on the polyamide resin, and the first temperature is effective to liquify the polyamide resin and to maintain an oil phase of a water and oil emulsion as a liquid; and
   (b) forming the aqueous microdispersion by:
   mixing together at a second temperature the water-in-oil emulsion and a second amount of water effective to form an oil-in-water emulsion;
   cooling the oil-in-water emulsion to a third temperature effective to form the aqueous microdispersion; and
   adding to the oil-in-water emulsion at the second temperature or to the aqueous microdispersion at least one water soluble, dipolar chemical moiety in an amount effective to stabilize the aqueous microdispersion, said water soluble, dipolar chemical moiety being selected from the group consisting of amino acid of the formula

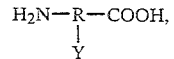

anionic and cationic salts derived therefrom and mixtures thereof, wherein R represents an alkyl, alkenyl, or aryl group having up to 10 carbon atoms and Y is a polar or non-polar, ionic or non-ionic substituent.

2. The method of claim 1 wherein the surfactant is selected from the group consisting of anionic, cationic, non-ionic, and amphoteric surfactants.

3. The method of claim 1 wherein the amount of surfactant effective to form the water-in-oil emulsion is from about 0.05% to about 10% by weight, based on the weight of the polyamide resin.

4. The method of claim 1 wherein the co-surfactant is selected from the group consisting of alcohols having up to 10 carbon atoms.

5. The method of claim 4 wherein the co-surfactant is isopropyl alcohol.

6. The method of claim 1 wherein the amount of co-surfactant effective to form the aqueous microdispersion is from about 10% to about 40% by weight, based on the weight of the resin.

7. The method of claim 1 wherein the water soluble, dipolar chemical moiety is selected from the group consisting of p-aminobenzoic acid and glycine.

8. The method of claim 1 wherein the amount of the water soluble, dipolar chemical moiety effective to stabilize the aqueous microdispersion is from about 0.25% to about 3.0% by weight, based on the weight of polyamide resin.

9. The method of claim 1 wherein the water-in-oil emulsion comprises from about 5% to about 50% by weight of water.

10. The method of claim 1 wherein the oil-in-water emulsion comprises from about 20% to about 60% by weight of polyamide resin.

11. The method of claim 1 wherein the aqueous microdispersion comprises solid, dispersed resin particles having a volume average size distribution of less than about 1000 nanometers.

12. The method of claim 11 wherein the aqueous microdispersion comprises solid, dispersed resin particles having a volume average size distribution of between about 10 and about 400 nanometers.

13. The method of claim 12 wherein the aqueous microdispersion comprises solid, dispersed resin particles having a volume average size distribution of between about 100 and about 150 nanometers.

14. The method of claim 1 wherein the first temperature is at least as high as the melting point of the oil phase.

15. The method of claim 1 wherein the second temperature is above the melting point of the oil phase and less than but not more than 50° C. below the softening point of the polyamide resin.

16. The method of claim 1 wherein the third temperature is below the melting point of the oil phase.

17. The aqueous microdispersion prepared according to claim 1.

18. A clear, continuous film formed at ambient or near-ambient temperatures from the aqueous microdispersion prepared according to claim 1.

19. A process for preparing a stable, aqueous microdispersion of a polyamide resin, comprising the ordered steps of:
  (a) heating the polyamide resin substantially in the absence of oxygen to a first temperature at least as high as its melting point to liquify the resin;
  (b) forming a homogeneous mixture of the liquid polyamide resin, water, at least one surfactant, and at least one co-surfactant by mixing together, at a second temperature effective to maintain an oil phase of a water and oil emulsion as a liquid,
    the liquified polyamide resin;
    a first amount of water effective to form the homogeneous mixture;
    at least one surfactant in an amount effective to form a water-in-oil emulsion; and
    at least one co-surfactant in an amount effective to form the aqueous microdispersion;
  (c) mixing with the homogeneous mixture a second amount of water effective to form a water-in-oil emulsion, said second amount of water including an amount of acid or base effective to neutralize residual acid or base on the polyamide resin;
  (d) mixing with the water-in-oil emulsion at a third temperature a third amount of water effective to form an oil-in-water emulsion, said third amount of water including at least one water soluble, dipolar chemical moiety in an amount effective to stabilize the aqueous microdispersion, said water soluble, dipolar chemical moiety being selected from the group consisting of amino acids of the formula

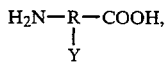

anionic and cationic salts derived therefrom and mixtures thereof, wherein R represents an alkyl, alkenyl or aryl group having up to 10 carbon atoms, Y is any polar or non-polar, ionic or nonionic substituent;
    wherein said third temperature is above the melting point of the oil phase and less than but not more than about 50° C. below the softening point of the polyamide resin; and
  (e) cooling the oil-in-water emulsion to a fourth temperature below the melting point of the oil phase to form the aqueous microdispersion.

20. The method of claim 19 wherein the surfactant is selected from the group consisting of anionic, cationic, non-ionic, and amphoteric surfactants.

21. The method of claim 19 wherein the amount of surfactant effective to form the water-in-oil emulsion is from about 0.05% to about 10% by weight, based on the weight of the polyamide resin.

22. The method of claim 19 wherein the co-surfactant is selected from the group consisting of alcohols having up to 10 carbon atoms.

23. The method of claim 22 wherein the co-surfactant is isopropyl alcohol.

24. The method of claim 19 wherein the amount of co-surfactant effective to form the aqueous microdispersion is from about 10% to about 40% by weight, based on the weight of the resin.

25. The method of claim 19 wherein the water soluble, dipolar chemical moiety is selected from the group consisting of p-aminobenzoic acid and glycine.

26. The method of claim 19 wherein the amount of the water soluble, dipolar chemical moiety effective to stabilize the aqueous microdispersion is from about 0.25% to about 3.0% by weight, based on the weight of polyamide resin.

27. The method of claim 19 wherein the water-in-oil emulsion comprises from about 5% to about 50% by weight of water.

28. The method of claim 19 wherein the oil-in-water emulsion comprises from about 20% to about 60% by weight of polyamide resin.

29. The method of claim 19 wherein the aqueous microdispersion comprises solid, dispersed resin particles having a volume average size distribution of less than about 1000 nanometers.

30. The method of claim 29 wherein the aqueous microdispersion comprises solid, dispersed resin particles having a volume average size distribution of between about 10 and about 400 nanometers.

31. The method of claim 30 wherein the aqueous microdispersion comprises solid, dispersed resin particles having a volume average size distribution of between about 100 and about 150 nanometers.

32. The aqueous microdispersion prepared according to claim 19.

33. A clear, continuous film formed at ambient or near-ambient temperatures from the aqueous microdispersion prepared according to claim 19.

34. A process for preparing a stable, aqueous microdispersion of a polyamide resin, comprising the ordered steps of:
  (a) forming a mixture of polyamide resin, water, surfactant and co-surfactant by mixing:
    the polyamide resin;
    a first amount of water effective to form the mixture;
    at least one surfactant in an amount effective to form a water-in-oil emulsion upon liquification of the polyamide resin; and
    at least one co-surfactant in an amount effective to form the aqueous microdispersion;
  (b) heating the mixture to a first temperature, above the melting point of an oil phase of a water and oil emulsion, effective to liquify the polyamide resin in the mixture to form a homogeneous mixture of liquified polyamide resin, water, at least one surfactant, and at least one co-surfactant;
  (c) mixing with the homogeneous mixture a second amount of water effective to form a water-in-oil emulsion, said second amount of water including an amount of acid or base effective to neutralize residual acid or base on the polyamide resin;
  (d) mixing with the water-in-oil emulsion at a second temperature a third amount of water effective to form an oil-in-water emulsion, said third amount of water including at least one water soluble, dipolar chemical moiety in an amount effective to stabilize the aqueous microdispersion, said water soluble, dipolar chemical moiety being selected from the group consisting of amino acid of the formula

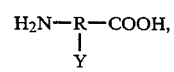

anionic and cationic salts derived therefrom and mixtures thereof, wherein R represents an alkyl, alkenyl or aryl group having up to 10 carbon atoms, Y is a polar or non-polar, ionic or nonionic substituent;
    wherein said second temperature is above the melting point of the oil phase and less than but not more than about 50° C. below the softening point of the polyamide resin; and (e) cooling the oil-in-water emulsion to a third temperature below the melting point of the oil phase to form the aqueous microdispersion.

35. The method of claim 34 wherein the surfactant is selected from the group consisting of anionic, cationic, non-ionic, and amphoteric surfactants.

36. The method of claim 34 wherein the amount of surfactant effective to form the water-in-oil emulsion is from about 0.05% to about 10% by weight, based on the weight of the polyamide resin.

37. The method of claim 34 wherein the co-surfactant is selected from the group consisting of alcohols having up to 10 carbon atoms.

38. The method of claim 37 wherein the co-surfactant is isopropyl alcohol.

39. The method of claim 34 wherein the amount of co-surfactant effective to form the aqueous microdispersion is from about 10% to about 40% by weight, based on the weight of the resin.

40. The method of claim 34 wherein the water soluble, dipolar chemical moiety is selected from the group consisting of p-aminobenzoic acid and glycine.

41. The method of claim 34 wherein the amount of the water soluble, dipolar chemical moiety effective to stabilize the aqueous microdispersion is from about 0.25% to about 3.0% by weight, based on the weight of polyamide resin.

42. The method of claim 34 wherein the water-in-oil emulsion comprises from about 5% to about 50% by weight of water.

43. The method of claim 34 wherein the oil-in-water emulsion comprises from about 20% to about 60% by weight of polyamide resin.

44. The method of claim 34 wherein the aqueous microdispersion comprises solid, dispersed resin particles having a volume average size distribution of less than about 1000 nanometers.

45. The method of claim 44 wherein the aqueous microdispersion comprises solid, dispersed resin particles having a volume average size distribution of between about 10 and about 400 nanometers.

46. The method of claim 45 wherein the aqueous microdispersion comprises solid, dispersed resin particles having a volume average size distribution of between about 100 and about 150 nanometers.

47. The aqueous microdispersion prepared according to claim 34.

48. A clear, continuous film formed at ambient or near-ambient temperatures from the aqueous microdispersion prepared according to claim 34.

49. A stable, aqueous microdispersion of polyamide resin particles in water, said aqueous microdispersion having the capacity to form clear, continuous films at ambient or near-ambient temperatures, comprising:
between about 20% and about 60% by weight polyamide resin;
between about 30% and about 70% by weight water;
at least one surfactant in an amount effective to form a water-in-oil emulsion upon liquification of the polyamide resin;
at least one co-surfactant in an amount effective to form the aqueous microdispersion;
an amount of acid or base effective to neutralize residual acid or base on the polyamide resin; and
an amount of at least one water soluble, dipolar chemical moiety effective to stabilize the aqueous microdispersion, said water soluble, dipolar chemical moiety being selected from the group consisting of amino acid of the formula

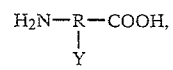

anionic and cationic salts derived therefrom and mixtures thereof, wherein R represents an alkyl, alkenyl or aryl group having up to 10 carbon atoms and Y is any polar or non-polar, ionic or non-ionic substituent.

50. The aqueous microdispersion of claim 49 wherein the surfactant is selected from the group consisting of anionic, cationic, non-ionic, and amphoteric surfactants.

51. The aqueous microdispersion of claim 49 wherein the amount of surfactant effective to form the water-in-oil emulsion is from about 0.05% to about 10% by weight, based on the weight of the polyamide resin.

52. The aqueous microdispersion of claim 49 wherein the co-surfactant is an alcohol having up to 10 carbon atoms.

53. The aqueous microdispersion of claim 52 wherein the co-surfactant is isopropyl alcohol.

54. The aqueous microdispersion of claim 49 wherein the amount of co-surfactant effective to form the aqueous microdispersion is from about 10% to about 40% by weight, based on the weight of the resin.

55. The aqueous microdispersion of claim 49 wherein the water soluble, dipolar chemical moiety is selected from the group consisting of p-aminobenzoic acid and glycine.

56. The aqueous microdispersion of claim 49 wherein the amount of the water soluble, dipolar chemical moiety effective to stabilize the aqueous microdispersion is from about 0.25% to about 3.0% by weight, based on the weight of polyamide resin.

57. The aqueous microdispersion of claim 49 wherein the polyamide resin particles have a volume average size distribution of less than about 1000 nanometers.

58. The aqueous microdispersion of claim 57 wherein the polyamide resin particles have a volume average size distribution between about 10 and about 400 nanometers.

59. The aqueous microdispersion of claim 58 wherein the polyamide resin particles have a volume average size distribution of between about 100 and about 50 nanometers.

60. A clear, continuous film formed at ambient or near-ambient temperatures from the aqueous microdispersion of claim 49.

61. A stable, aqueous microdispersion of polyamide resin particles in water, comprising:
between about 20% and about 60% by weight polyamide resin;
between about 30% and about 70% by weight water;
between about 0.05% and about 10% by weight, based on the weight of the resin, of at least one surfactant selected from the group consisting of anionic, cationic, non-ionic and amphoteric surfactants;
between about 10% and about 40% by weight, based on the weight of the resin, of at least one co-surfactant selected from the group consisting of alcohols having up to 10 carbon atoms;
an amount of acid or base effective to neutralize residual acid or base on the polyamide resin; and
between about 0.25% and about 3.0% by weight, based on the weight of resin, of at least one water soluble, dipolar chemical moiety selected from the group consisting of amino acid of the formula

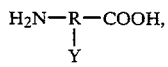

anionic and cationic salts derived therefrom and mixtures thereof, wherein R represents an alkyl, alkenyl or aryl group having up to 10 carbon atoms and Y is a polar or non-polar, ionic or non-ionic substituent;

wherein the polyamide resin particles have a volume average size distribution of less than about 1000 nanometers.

62. A clear, continuous film formed at ambient or near-ambient temperatures from the aqueous microdispersion of claim 61.

* * * * *